(12) United States Patent
Hundemer

(10) Patent No.: US 9,094,284 B1
(45) Date of Patent: Jul. 28, 2015

(54) SYSTEM AND METHOD FOR TRANSMITTING A PACKET STREAM TO A DEVICE

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 46 days.

(21) Appl. No.: 14/047,805

(22) Filed: Oct. 7, 2013

Related U.S. Application Data

(60) Provisional application No. 61/885,944, filed on Oct. 2, 2013.

(51) Int. Cl.
*H04L 12/28* (2006.01)
*H04L 12/931* (2013.01)

(52) U.S. Cl.
CPC ...................................... *H04L 49/00* (2013.01)

(58) Field of Classification Search
None
See application file for complete search history.

(56) References Cited

U.S. PATENT DOCUMENTS

| | | | | |
|---|---|---|---|---|
| 6,909,874 | B2* | 6/2005 | Holtz et al. .................... | 434/362 |
| 2002/0083468 | A1* | 6/2002 | Dudkiewicz ................. | 725/133 |
| 2002/0108115 | A1* | 8/2002 | Palmer ........................... | 725/50 |
| 2011/0023059 | A1* | 1/2011 | McCallister et al. ........... | 725/32 |
| 2011/0038597 | A1* | 2/2011 | McCallister et al. ......... | 386/239 |

OTHER PUBLICATIONS

Hundemer, Hank J., U.S. Appl. No. 14/047,795, filed Oct. 7, 2013.
Disclosures referenced in the accompanying Declaration by Hank J. Hundemer.

* cited by examiner

*Primary Examiner* — Frank Duong
(74) *Attorney, Agent, or Firm* — McDonnell Boehnen Hulbert & Berghoff LLP

(57) ABSTRACT

Disclosed is a system and method for transmitting a packet stream to a device. An example method involves: a first device recording a packet stream transmitted from a second device to a third device; identifying a first packet having a final portion of a first data block, wherein a second packet is next after the first packet; determining a time period between transmission of the first and second packets; using the recorded packet stream to generate another packet stream; identifying a third packet that includes a final portion of a second data block corresponding to the first data block, wherein a fourth packet is next after the third packet; and transmitting the generated packet stream to the third device, wherein transmitting the generated packet stream to the third device involves: transmitting the third packet and following at least the determined time period after transmitting the third packet, transmitting the fourth packet.

20 Claims, 5 Drawing Sheets

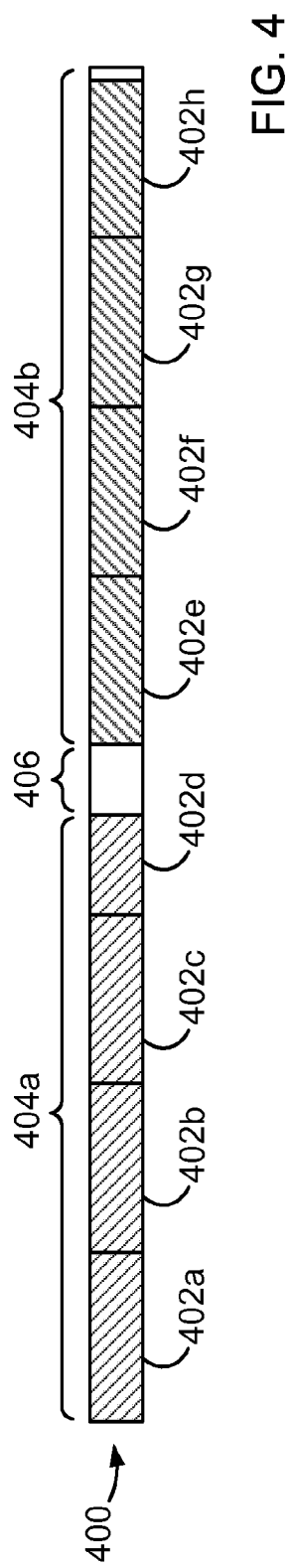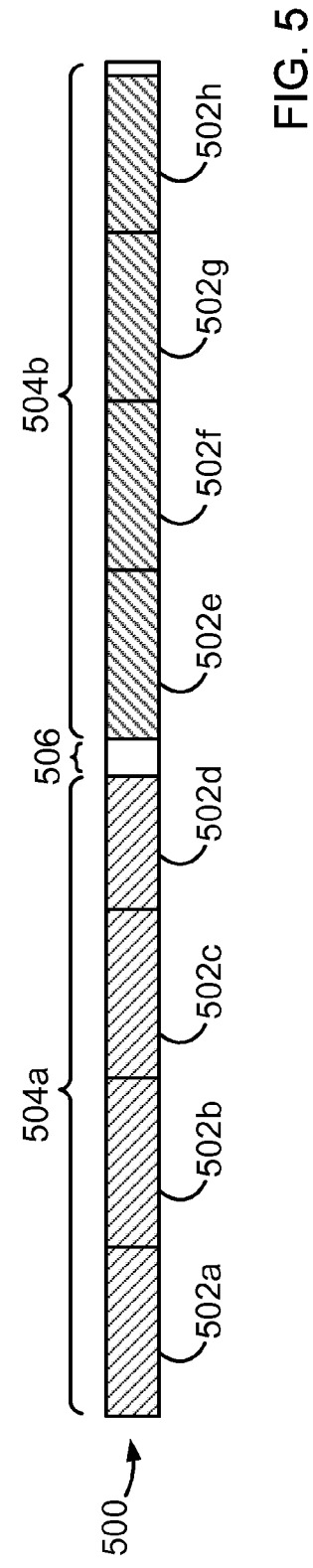

SYSTEM AND METHOD FOR TRANSMITTING A PACKET STREAM TO A DEVICE

CROSS REFERENCES TO RELATED DISCLOSURES

The present disclosure claims priority to U.S. Provisional Patent Application No. 61/885,944, entitled "SYSTEM AND METHOD FOR TRANSMITTING DATA TO A DEVICE BASED ON AN ENTRY OF A RUNDOWN FOR A NEWS PROGRAM," which was filed on Oct. 2, 2013, and which is hereby incorporated by reference.

The present disclosure also relates to U.S. patent application No. 61/920,977, entitled "SYSTEM AND METHOD FOR TRANSMITTING DATA TO A DEVICE BASED ON AN ENTRY OF A RUNDOWN FOR A NEWS PROGRAM", which is assigned to the assignee of the present disclosure, which is being filed simultaneously with the present disclosure, and which is hereby incorporated by reference herein.

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

TECHNICAL FIELD

This disclosed system and method relate generally to packet-based communication such as in a news production system environment.

BACKGROUND

Unless otherwise indicated herein, the materials described in this section are not prior art to the claims in this disclosure and are not admitted to be prior art by inclusion in this section.

A news production system (NPS) may facilitate the production of a news program in the form of a media stream. In one example, an NPS may include multiple media sources and a production switcher, where outputs of the media sources are connected to inputs of the production switcher. This may allow the production switcher to switch between and/or combine multiple media streams output by the media sources, thereby outputting the news program in the form of another media stream.

There are various types of media, including for example, audio, video, or a combination thereof. As such, in one example, an NPS may output a news program in the form of an audio stream. In this instance, the NPS may transmit the audio stream to a radio-broadcasting system for broadcast. As another example, a media stream may take the form of a video stream or a combined audio and video stream. In such instances, the NPS may transmit the video stream or the combined audio and video stream to a television-broadcasting system for broadcast.

A media source may take a variety of forms. For example, a media source may take the form of a media server. A media server is a device configured for retrieving a media file, converting the retrieved media file into a media stream, and outputting the converted media stream.

As another example, a media source may take the form of a media effect engine. A media effect engine is a device configured for retrieving a media effect (sometimes referred to as a "page"), and running the media effect thereby outputting a corresponding media stream. A media effect may be stored as a file that includes instructions and other data (e.g., media) related to the media effect. By running the media effect, the media effect engine may generate and output a media stream based on those instructions. Media effects are commonly used as a means to generate animations, graphics, or other visual effects in the form of a media stream that can be overlaid on another media stream. For instance, in the context of a news program, a "lower third" media effect may be used to overlay a graphic over a lower third portion of a media stream.

As such, in one example NPS, a media server may output a first media stream while a media effect engine outputs a second media stream, and a production switcher may combine the two media streams (e.g., by overlaying the second media stream over the first media stream) to output the news program in the form of a third media stream. The production switcher may then transmit the third media stream to a broadcasting system (e.g., a television-broadcasting system) for broadcast.

A media effect engine may be controlled in a variety of ways such that it may perform the steps of retrieving a media effect and running the media effect. For instance, a user may control a media effect engine by providing it a suitable instruction via a user-interface. However, for a variety of reasons, this manner of controlling the media effect engine may be undesirable. Among other things, this process may be time-consuming for the user. In addition, it may be difficult for the user to ensure that the media effect engine performs such steps at appropriate times during production of the news program.

As another example, a controller device may control a media effect engine by providing it a suitable instruction in accordance with one or more application programming interfaces (API) that may be made publically available by the provider of the media effect engine or another entity. However, again for a variety of reasons, this manner of controlling the media effect engine may be undesirable. Among other things, it may be time-consuming for a user to configure the controller device to provide such a suitable instruction.

This approach may be particularly time-consuming given that different instructions may need to adhere to different APIs. For instance, an instruction requesting the running of one type of media effect may need to adhere to a different API than another instruction requesting the running of another type of media effect. In addition, it may be difficult for the user to configure the controller device such that it causes the media effect engine to retrieve and run a particular media effect at an appropriate time during production of the news program.

SUMMARY

In one aspect, an example method involves: (i) a first device recording a packet stream transmitted from a second device to a third device, the recorded packet stream including multiple distinct data blocks; (ii) identifying in the recorded packet stream a first packet having a final portion of a first data block, wherein in the recorded packet stream a second packet is next after the first packet; (iii) determining a time period between transmission of the identified first packet and transmission of the second packet; (iv) using the recorded packet stream to generate another packet stream including multiple distinct data blocks; (v) identifying in the generated packet stream a third packet that includes a final portion of a second data block that corresponds to the first data block, wherein in the generated packet stream a fourth packet is next after the third packet; and (vi) transmitting the generated packet stream to the third device, wherein transmitting the generated packet stream to the third device involves: (a) transmitting the third packet (b) and, following at least the determined time period after transmitting the third packet, transmitting the fourth packet.

In another aspect, an example method involves: (i) a device recording a packet stream transmitted from a media effect designer to a media effect engine, the recorded packet stream including multiple distinct data blocks, each data block representing at least a portion of a media effect command; (ii) identifying in the recorded packet stream a first packet having a final portion of a first data block, wherein in the recorded packet stream a second packet is next after the first packet; (iii) determining a time period between transmission of the identified first packet and transmission of the second packet; (iv) using the recorded packet stream to generate another packet stream including multiple distinct data blocks; (v) identifying in the generated packet stream a third packet that includes a final portion of a second data block that corresponds to the first data block, wherein in the generated packet stream a fourth packet is next after the third packet; and (vi) transmitting the generated packet stream to the media effect engine, wherein transmitting the generated packet stream to the media effect engine involves: (a) transmitting the third packet (b) and, following at least the determined time period after transmitting the third packet, transmitting the fourth packet.

In another aspect a system is disclosed. The system includes a non-transitory computer-readable medium including instructions that, when executed by a processor, cause performance of a set of steps including: (i) recording a packet stream transmitted from a first device to a second device, the recorded packet stream including multiple distinct data blocks; (ii) identifying in the recorded packet stream a first packet having a final portion of a first data block, wherein in the recorded packet stream a second packet is next after the first packet; (iii) determining a time period between transmission of the identified first packet and transmission of the second packet; (iv) using the recorded packet stream to generate another packet stream including multiple distinct data blocks; (v) identifying in the generated packet stream a third packet that includes a final portion of a second data block that corresponds to the first data block, wherein in the generated packet stream a fourth packet is next after the third packet; and (vi) transmitting the generated packet stream to the second device, wherein transmitting the generated packet stream to the second device involves: (a) transmitting the third packet (b) and, following at least the determined time period after transmitting the third packet, transmitting the fourth packet.

These, as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4 is a simplified diagram of a first example packet stream in accordance with the disclosed system and method.
FIG. 5 is a simplified diagram of a second example packet stream in accordance with the disclosed system and method.

DETAILED DESCRIPTION OF THE DRAWINGS

I. Overview

Figure 1:
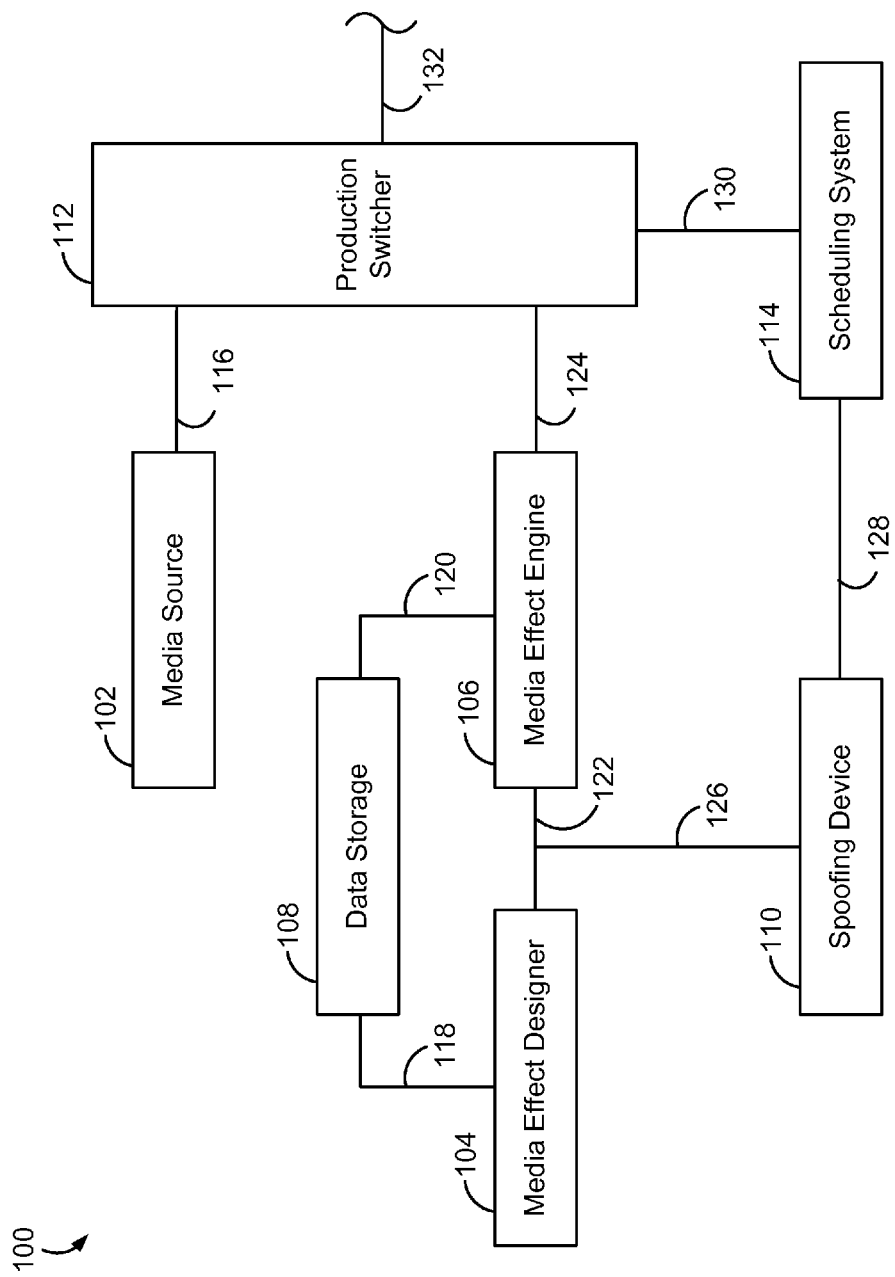
FIG. 1 is a simplified diagram of an example NPS.

As noted above, a media effect engine may be configured for retrieving a media effect and running the media effect, thereby outputting a media stream. However, before the media effect engine may retrieve a media effect, the media effect must first be designed and stored. A media effect designer may be used for this purpose.

A media effect designer is a device configured for designing and storing a media effect. Like a media effect engine, a media effect designer may be controlled in a variety of ways. For instance, a user may control a media effect designer by providing it a suitable instruction via a user-interface. As such, in an instance where a media effect takes the form of a file including instructions and other data, the media effect designer may create or edit that file based on instructions received from a user.

In some instances, a media effect designer may cause the media effect designer to retrieve and run a media effect on a preview channel of the media effect engine. This may involve the media effect designer transmitting to the media effect engine a packet stream including a suitable instruction that causes the media effect engine to retrieve and run the media effect on the preview channel. Typically, such an instruction does not adhere to the APIs discussed above. But instead, the instruction typically adheres to a particular protocol that is understood by both the media effect designer and the media effect engine, but that is not made publically available by the provider of the media effect engine or another entity.

The packet stream transmitted from the media effect designer to the media effect engine may be leveraged to allow a "spoofing" device to control the media effect engine at a later time. This may involve the spoofing device recording a packet stream transmitted from the media effect designer to the media effect engine, and later transmitting the recorded packet stream to the media effect engine. With this technique, a device other than the media effect designer may cause the media effect engine to retrieve and run the media effect, all without the device transmitting to the media effect engine an instruction that adheres to one of the APIs as discussed above.

In some instances, it may be desired for this other device to cause the media effect engine to retrieve and run a modified version of the media effect that was in the originally recorded packet stream. Performing this process may involve the spoofing device recording a packet stream transmitted from the media effect designer to the media effect engine, using the recorded packet stream to generate another packet stream (that is a modified version of the recorded packet stream), and transmitting the generated packet stream to the media effect engine.

Notably however, despite transmitting the generated packet stream to the media effect engine, the media effect engine may be unable to properly process the transmitted packet stream. This is because a given packet stream may need to be transmitted to the media effect engine in accordance with one or more timing restrictions in order for the media effect engine to be able to successfully process the packet stream (i.e., such that the media effect engine can actually carry out the instructions included in the packet stream).

The disclosed system and method addresses this issue by ensuring that packets in the generated data stream are transmitted according to a timing scheme that allows the media effect engine to successfully process the transmitted packet stream.

More particularly, in one example, the method may involve a spoofing device recording a packet stream transmitted from a media effect designer to a media effect engine, where the recorded packet stream includes multiple distinct data blocks. The method may further involve the spoofing device identifying in the recorded packet stream a first packet having a final portion of a first data block, where in the recorded packet stream a second packet is next after the first packet.

The example method may also involve the spoofing device determining a time period between transmission of the identified first packet and transmission of the second packet, and using the recorded packet stream to generate another packet stream including multiple distinct data blocks. In addition, the method may involve the spoofing device identifying in the generated packet stream a third packet that includes a final portion of a second data block that corresponds to the first data block, where in the generated packet stream a fourth packet is next after the third packet.

Still further, the example method may involve the spoofing device transmitting the generated packet stream to the media effect engine, which may involve: (i) transmitting the third packet and (ii) following at least the determined time period after transmitting the third packet, transmitting the fourth packet.

By the spoofing device "delaying" for at least the determined time period before transmitting the fourth packet, the transmission of the third and fourth packets may be separated by a time period that is likely long enough to allow the media effect engine to successfully process them. If the media effect engine is still unable to successfully process them, the spoofing device may reattempt transmitting the packet stream, but with an ever greater delay between transmission of the third and fourth packets. This process may be repeated in connection with multiple pairs of adjacent packets in the packet stream until the packet stream is successfully transmitted to the media effect engine.

Also, in some examples, a scheduling system may be configured to cause the spoofing device to perform such functions based on an entry in a rundown. Generally, a rundown is a schedule of events (and related information) that make up a news program. Based on a rundown entry being associated with an assigned identifier, the scheduling system may cause the media effect engine to retrieve and run the media effect. This may involve the scheduling system selecting an entry from the rundown, the scheduling system making a determination that the selected entry corresponds to an assigned identifier, and responsive to the scheduling system making the determination, the scheduling system causing the spoofing device to transmit a packet stream generated from a recorded packet stream to the media effect engine.

The scheduling system may also be configured to select and process rundown entries in order. As such, a user may control the timing as to when the media effect engine retrieves and runs a particular media effect by ensuring that the corresponding assigned identifier is associated with a particular rundown entry.

II. Example NPS

FIG. 1 is a simplified block diagram of an example NPS 100. The NPS 100 may be configured to perform a variety of steps related to producing a news program. The NPS may output the news program in the form of a media stream, which in turn may be transmitted to a broadcasting system for broadcast. A media stream may be transmitted according to a variety of different standards. For instance, a media stream may be transmitted according to the high-definition serial digital interface (HD-SDI) (with a data transfer rate of 1.485 Gbps).

The NPS 100 may include one or more devices, including for example a media source 102, a media effect designer 104, a media effect engine 106, a data storage 108, a spoofing device 110, a production switcher 112, and a scheduling system 114.

These devices may be connected with each other and/or with external devices via one or more communication paths. For example, the media source 102 and the production switcher 110 may be connected via a path 116, the media effect designer 104 and the data storage 108 may be connected via a path 118, and the media effect engine 106 and the data storage 108 may be connected via a path 120.

In addition, the media effect designer 104 and the media effect engine 106 may be connected via a path 122, the media effect engine 106 and the production switcher 112 may be connected via the path 124, and the spoofing device 110 and the path 122 may be connected via a path 126. Still further, the spoofing device 110 and the scheduling system 114 may be connected via a path 128, the scheduling system 114 and the production system 112 may be connected via a path 130, and the production system 110 and an external device (e.g., a router of a broadcasting system) may be connected via a path 132.

Though these communication paths, a device may transmit various types of data to one or more other devices. For example, one device may transmit instructions to a second device to control the second device. As another example, one device may transit a media stream to another device. Notably, such devices may exchange data according to one or more standards or protocols. For example, one device may send data to another device in the form of a packet stream.

Generally, the media source 102 is a device configured for outputting a media stream, and may take a variety of forms. For example, the media source 102 may take the form of a media server, which is a device configured for retrieving a media file, converting the retrieved media file into a media stream, and outputting the converted media stream. An example of a media server is the K2 server provided by Grass Valley™ of San Francisco, Calif. As additional examples, the media source 102 may take the form of a satellite receiver or a video camera. As the media source 102 outputs a media stream, the media source 102 may transmit the media stream to the production switcher via the path 116.

Generally, the media effect designer 104 is a device configured for designing and storing a media effect. The media effect designer 104 may design a media effect based on input received from a user via a user-interface. Then, the media effect designer 104 may store the media effect in the data storage 108 such as in the form of a file. An example of a media effect designer is the Viz Artist provided by Vizrt™ of Bergen, Norway.

Generally, the media effect engine 106 is a type of media source, and is a device configured for retrieving a media effect and running the retrieved media effect, thereby outputting a corresponding media stream. The media effect engine 106 may retrieve a media effect from the data storage 108. And as the media effect engine 106 outputs a media stream, the media effect engine 106 may transmit the media stream to the production switcher 112 via the path 124. An example of a media effect engine is the Viz Video Engine provided by Vizrt™ of Bergen, Norway.

As noted above, the media effect designer 104 may be configured for transmitting to the media effect engine 106, instructions that cause the media effect engine 106 to retrieve and run a media effect on a preview channel of the media effect engine 106. This allows a user to preview the media effect as the user is designing it.

Generally, the spoofing device 110 is configured for recording data and transmitting the recorded data (or a modified version thereof) to another device. For instance, the spoofing device 110 may be configured for recording data transmitted from the media effect designer 104 to the media effect engine 106 such as via path 122 (the spoofing device 110 may access this data via the path 126). In one example, the path 122 may be a path of a packet-based network, and the path 126 may provide the spoofing device 110 with access to that network such that the spoofing device may monitor packet transmission over the network. Further, the spoofing device 110 may be configured for transmitting the recorded data (or a variation thereof) to the media effect engine 106 such as via the paths 126 and 122. In one example, the spoofing device may provide such functionality by running a network protocol analyzer and/or packet generator application such as Sniffer Portable Professional Analyzer provided by NetScout™ of Westford, Mass.

Generally, the production switcher 112 is a device configured for performing functions related to input-to-output mapping. For instance, the production switcher 110 may be configured for switching between and/or combining multiple media streams output by the media sources 102 and 106 and transmitted to the production switcher 112 (via paths 116 and 124, respectively), so the production switcher 112 may output a news program in the form of a media stream. The production switcher 112 may transmit this media stream to an external device such as a router of a broadcasting system via the path 132. Note that this media stream may be subjected to additional processing before being broadcast. For example, the media stream may be modified with a digital video effect (DVE) before being broadcast. An example of a production switcher is the Vision switcher provided by Ross Video™ of Iroquois, Ontario in Canada.

Generally, the scheduling system 114 is a device configured for performing functions related to scheduling and managing the production of a news program, and for controlling one or more other devices in the NPS 100. For example, the scheduling system may be configured for creating or editing a rundown based on input from a user via a user-interface. Further, the scheduling system 112 may be configured for traversing and processing entries in a rundown. Yet further, the scheduling system 114 may be configured for controlling the spoofing device 110 (via path 128) and the production switcher 112 (via path 130).

Figure 2:
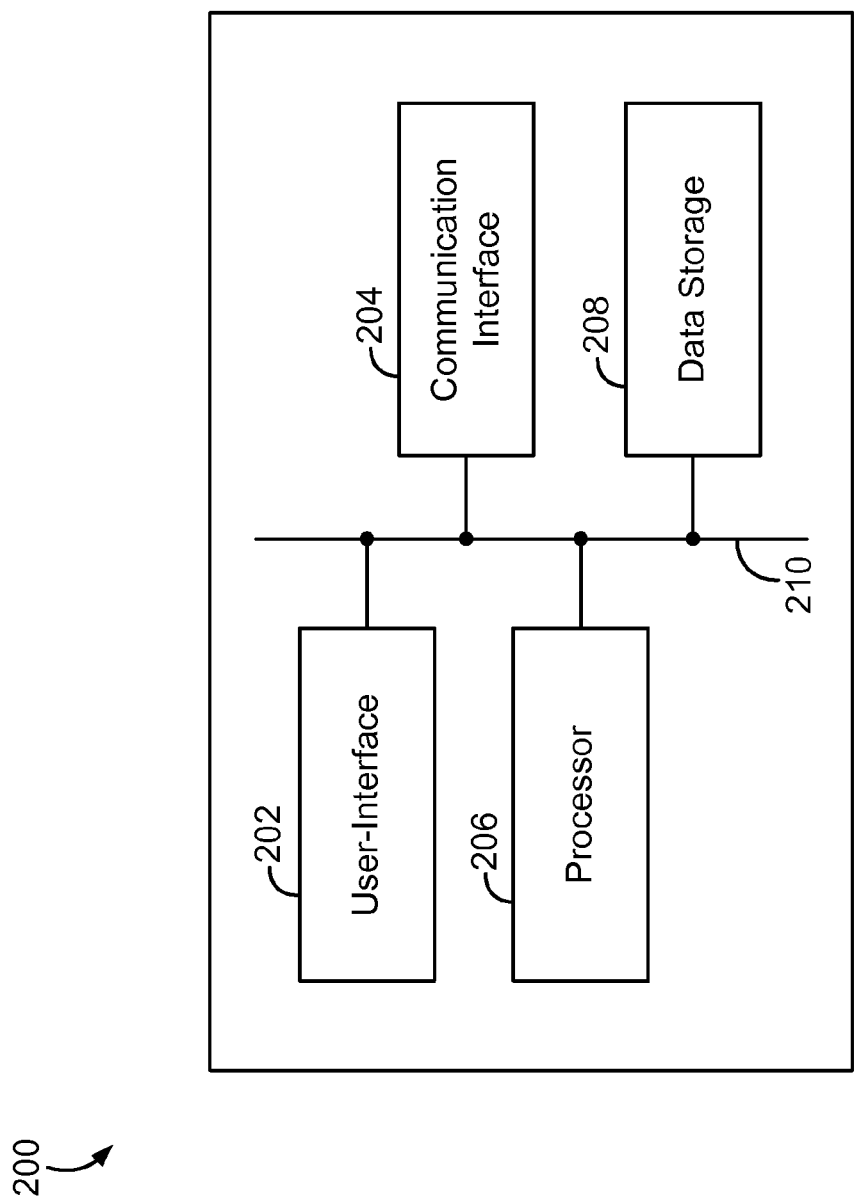
FIG. 2 is a simplified diagram of an example device.

FIG. 2 is a simplified block diagram of a device 200. The device 200 may take a variety of forms, including, for example, the media source 102, the media effect designer 104, the media effect engine 106, the data storage 108, the spoofing device 110, the production switcher 112, or the scheduling system 114.

The device 200 may include various components, including, for example, a user-interface 202, a communication interface 204, a processor 206, and a data storage 208, all of which may be electronically connected to each other via a system bus or other connection mechanism 210. Note that the device 200 need not include all of these components and it may include additional components.

The user-interface 202 may function to allow the device 200 to interact with a user, such as to receive input from a user and to provide output to the user. Thus, the user-interface 202 may include input components such as a computer mouse, a keyboard, or a touch-sensitive panel. The user-interface 202 may also include output components such as a display screen (which, for example, may be combined with a touch-sensitive panel) or a speaker.

The communication interface 204 may function to allow the device 200 to communicate with one or more other devices (e.g., over one or more paths as described above). The communication interface 204 may be configured to transmit and/or receive various types of data, including for example control data or media stream data. In one example, the communication interface 204 may take the form of a wired interface, such as an Ethernet port, USB port, or HD-SDI port. As another example, the communication interface 204 may take the form of a wireless interface, such as a WiFi interface. In either case, the communication interface 204 may include communication input and/or communication output interfaces.

The processor 206 may include one or more general purpose processors (e.g., microprocessors) and/or one or more special purpose processors (e.g., digital signal processors (DSPs)).

The data storage 208 may include one or more volatile and/or non-volatile storage components, such as magnetic, optical, flash, or organic storage, and may be integrated in whole or in part with the processor 206. The data storage 208 may include removable and/or non-removable components. In some examples, the data storage 208 may include multiple storage drives that store data in a redundant and/or stripped configuration.

Generally, the processor 206 may be configured to execute program instructions (e.g., compiled or non-compiled program logic and/or machine code) stored in the data storage 208 to perform one or more of the steps described herein and/or shown in the accompanying drawings. As such, the data storage 208 may take the form of a non-transitory computer-readable storage medium, having stored thereon program instructions that, upon execution by the processor 206, cause the device 200 to perform one or more of the steps described herein and/or shown in the accompanying drawings.

III. Example Operations

Figure 3:
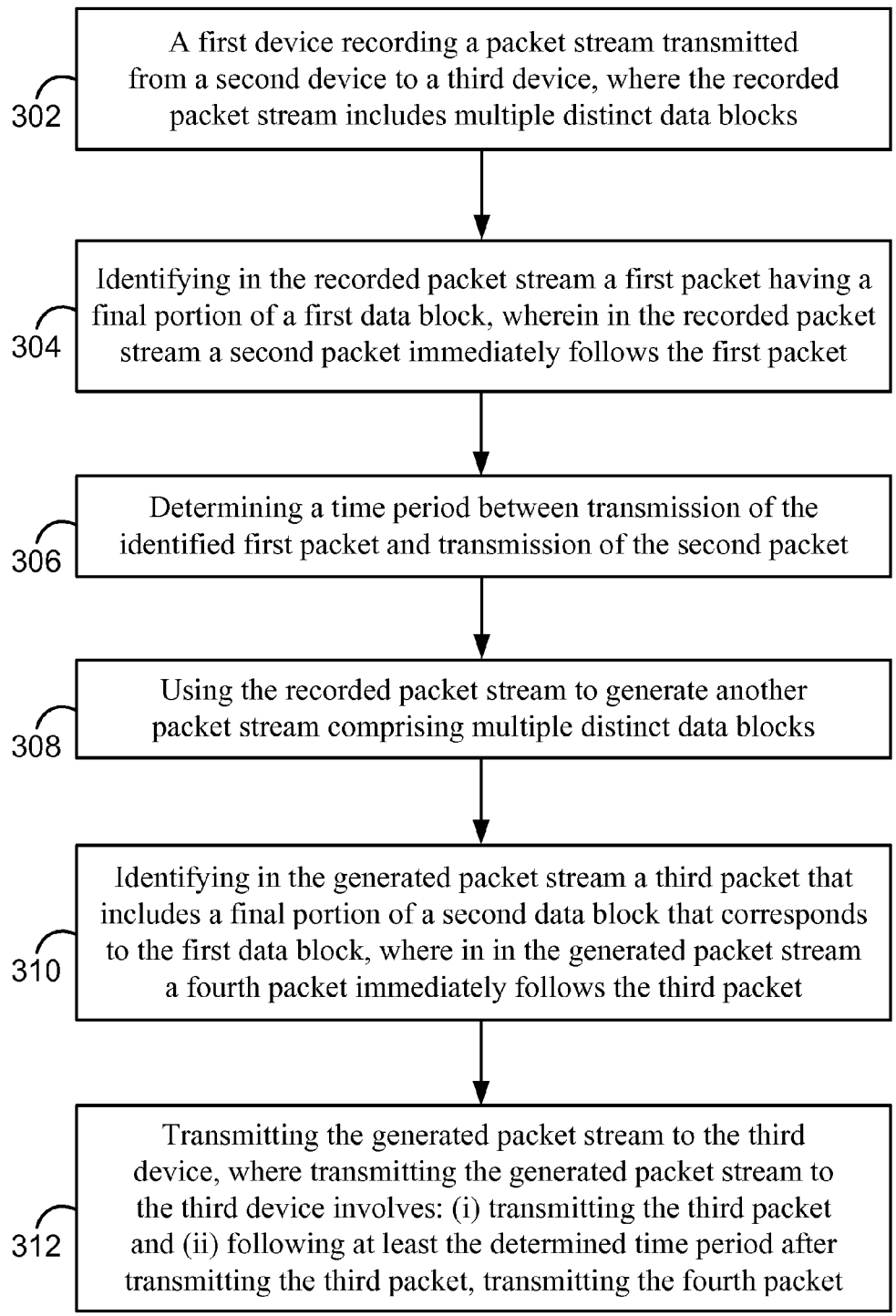
FIG. 3 is a flowchart showing steps of a first example of the disclosed method.

FIG. 3 is a flowchart showing steps of a first example of the disclosed method. At block 302, the method may involve a first device recording a packet stream transmitted from a second device to a third device, where the recorded packet stream includes multiple distinct data blocks. For instance, the method may involve the spoofing device 110 recording a packet stream transmitted from the media effect designer 104 to the media effect engine 106 (via path 122). In one example, the packet stream may include instructions that cause the media effect designer 104 to retrieve and run a media effect on a preview channel of the media effect engine 106.

Note that throughout this disclosure, numerical modifiers (e.g., first or second) are used to establish unique terms for ease of reference as opposed to indicating a particular characteristic (e.g., position or order) of the modified term.

The packet stream may represent various types of information. For example, the data may represent an instruction related to a media effect that the media effect designer is previewing. For instance, the packet stream may represent an instruction that causes the media effect engine to retrieve and run the media effect thereby outputting a corresponding media stream. Notably, in some instances, the packet stream may represent other instructions, such as instructions that cause the media effect engine 106 to load or mount the media effect. Such instructions may differ depending on the configuration of the media effect designer 104 and/or the media effect engine 106.

Generally, an instruction that causes a media effect engine to perform a function is referred to as a media effect command. A media effect command may be divided into multiple 1 data blocks (sometimes referred to as "synapses").

FIG. 4 shows an example recorded packet stream 400. The recorded packet stream 400 may be divided into eight packets 402a-402h, and may include two distinct data blocks 404a and 404b, each of which may represent a portion of a single media effect command. As shown, the data block 404a may span across packets 402a-c, and across a portion of packet 402d. And the data block 404b may span across packets 402e-g and across a portion of packet 402h. The data blocks 404a and 404b may be separated by an "empty" portion of packet 402d (e.g., a portion of consecutive zero bits shown as 406).

Returning to FIG. 3, in view of the example packet stream 400, the step at block 302 may involve the spoofing device 110 recording the packet stream 400 transmitted from the media effect designer 104 to the media effect engine 106 (via path 122).

At block 304, the method may involve identifying in the recorded packet stream a first packet having a final portion of a first data block, where in the recorded packet stream a second packet is (sequentially) next after the first packet. For instance, the method may involve the spoofing device 110 identifying in the recorded packet stream 400 a first packet 402d having a final portion of a first data block 404a, where in the recorded packet stream 400 a second packet 402e is (sequentially) next after the first packet 402d.

The spoofing device 110 may identify the first packet based on one or more characteristics relating to the first packet or the packet stream. For instance, the step of the spoofing device 110 identifying the first packet 402d may involve the spoofing device 110 determining that the first packet 402d includes a threshold amount of consecutive zero bits. The threshold amount can vary to suit a desired configuration. For example, the threshold amount may be a percentage of zero bits in the packet (e.g., thirty percent) or an absolute number of consecutive zero bits (e.g., ten). In one particular example, the absolute number may be a value in a range from zero to twelve-hundred.

Additionally or alternatively, the step of the spoofing device 110 identifying the first packet 402d may involve the spoofing device 110 determining that a difference in time between transmission of the packet 402d (e.g., by the media effect designer 104) and transmission of the packet 402e (e.g., by the media effect designer) exceeds a threshold time period. The threshold time period can vary to suit a desired configuration. For example, the threshold time period may be a value in a range from twenty to thirty milliseconds, and in a more particular example, the value may be twenty-five milliseconds. In some instances, the identifying techniques described above may be combined to identify the first packet.

Notably, the process of recording a packet stream may involve recording not only the data included in the packet stream, but also the time at which a packet in the packet stream is transmitted from the media effect designer 104 to the media effect engine 106.

At block 306, the method may involve determining a time period between transmission of the identified first packet and transmission of the second packet. For instance, the method may involve the spoofing device 110 determining a time period between transmission of the identified packet 402d by the media effect designer 104 and transmission of the second packet 402 by the media effect designer 104.

At block 308, the method may involve using the recorded packet stream to generate another packet stream including multiple distinct data blocks. For instance, the method may involve the spoofing device 110 using the recorded packet stream to generate another packet stream. In one example, spoofing device 110 may generate the packet stream based on input from a user via a user-interface. This may allow the user to facilitate generation of a packet stream that is a modification of the packet stream 400, such as by adding, removing, or modifying one or more of the parameters associated with the media effect (e.g., text used in connection with the media effect).

FIG. 5 shows an example of a generated packet stream 500 divided into eight sequential packets 502a-502h and that includes two distinct data blocks 504a and 504b, each of which represents a portion of a single media effect command. As shown, the data block 504a spans across packets 502a-c, and across a portion of packet 502d. And the data block 504b spans across packets 502e-g and across a portion of packet 502h. The data blocks 504a and 504b are separated by an "empty" portion of packet 502d (e.g., a portion of consecutive zero bits shown as 506). Note that as compared with the portion 406 in packet stream 400, the portion 506 in packet stream 500 represents a relatively smaller portion of consecutive zero bits. This smaller portion of consecutive zero bits may effectively reduce the time period between when the media effect engine 106 receives the first block 504a and the time it receives the second block 504. This may cause the media effect engine 106 to fail at processing the generated packet stream 500.

Returning to FIG. 3, at block 310, the method may involve identifying in the generated packet stream a third packet that includes a final portion of a second data block that corresponds to the first data block, where in the generated packet stream a fourth packet is (sequentially) next after the third packet. For instance, the method may involve the spoofing device 110 identifying in the generated packet stream 500 a third packet 502d that includes a final portion of a second data block 504a that corresponds to the first data block 504b, where in the generated packet stream 500 a fourth packet 502e is (sequentially) next after the third packet 502d.

In one example, the recorded data stream 400 and the generated data stream 500 may have an equal number of data blocks. As such, the data blocks may have an ordered, one-to-one correspondence. As such, the first data block 404a may correspond to the first data block 504a, and the second data block 404b may correspond to the second data block 504b.

At block 312, the method may involve transmitting the generated packet stream to the third device, where transmitting the generated packet stream to the third device involves: (i) transmitting the third packet and (ii) following at least the determined time period after transmitting the third packet, transmitting the fourth packet. For instance, the method may involve the spoofing device 110 transmitting the generated packet stream 500 to the media effect engine 106, where the spoofing device 110 transmitting the generated packet stream 500 to the media effect engine 106 involves: (i) the spoofing device 110 transmitting the third packet 502d to the media effect engine 106 and (ii) following at least the determined time period after transmitting the spoofing device 110 third packet 502d to the media effect engine 106, the spoofing device 110 transmitting the fourth packet 502e to the media effect engine.

By the spoofing device 110 "delaying" for at least the determined time period before transmitting the fourth packet 502e, the transmission of the third packet 502d and the fourth packet 502e may be separated by time period that is likely long enough to allow the media effect engine 106 to successfully process them. If the media effect engine 106 is still unable to successfully process them, the spoofing device 110 may reattempt transmitting the packet stream 500, but with an ever greater delay between transmission of the third packet 502d and the fourth packet 502e. This process may be repeated until the third packet 502d and fourth packet 502e are successfully transmitted to the media effect engine 106.

It should also be noted that the recorded packet stream 400 and the generated packet stream 500 have been greatly simplified for the purposes of providing examples of the disclosed system and method. In practice, packet streams are likely, although not required, to be divided into more packets and/or include more data blocks. As such, it is noted that the entire process described above may be repeated for multiple pair of adjacent packets within a packet stream such that a spoofing device may successfully transmit an entire packet stream to a media effect engine.

Figure 6:
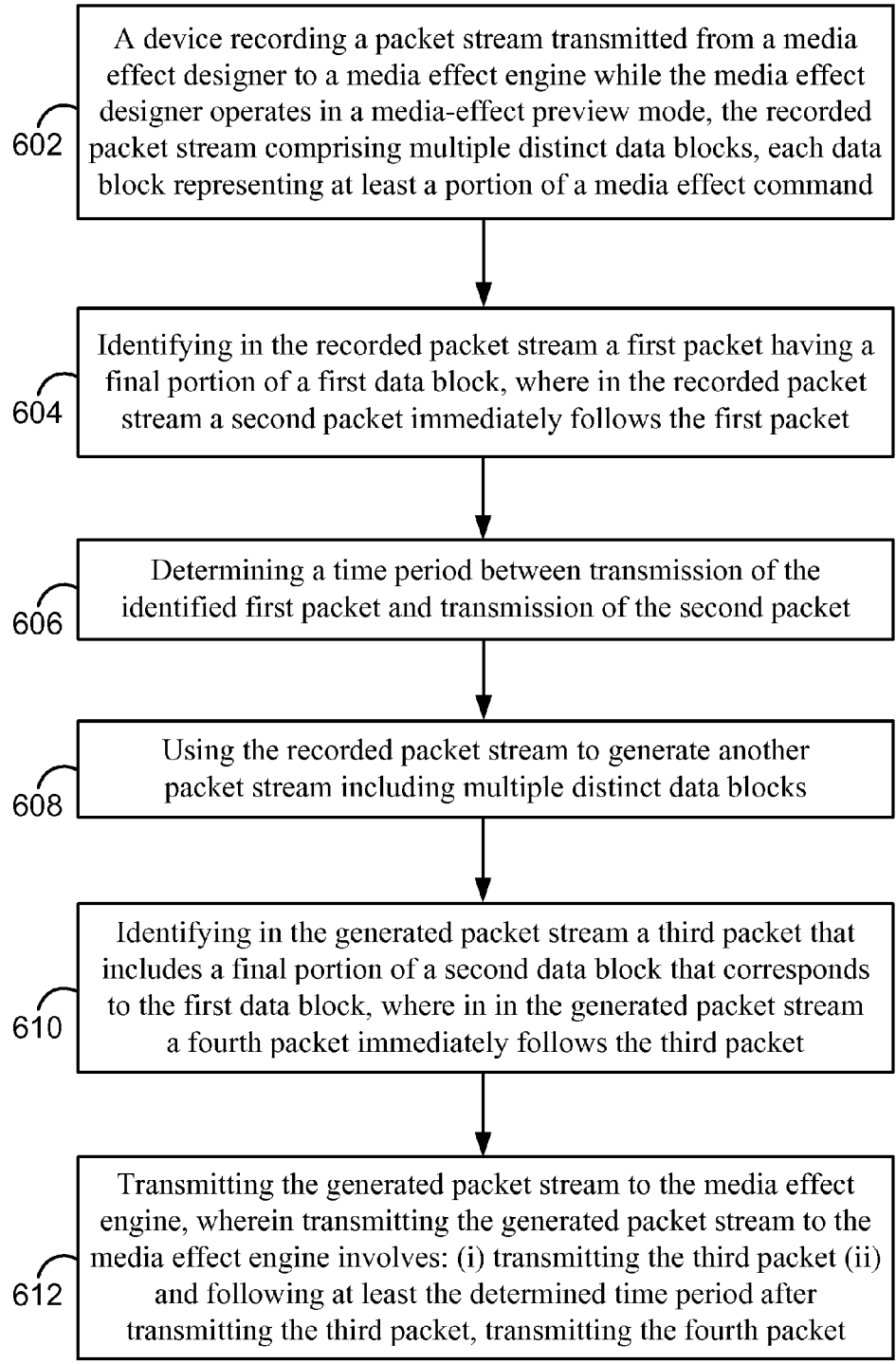
FIG. 6 is a flowchart showing steps of a second example of the disclosed method.

FIG. 6 is a flowchart showing steps of a second example of the disclosed method. At block 602, the method may involve a device recording a packet stream transmitted from a media effect designer to a media effect engine, where the recorded packet stream including multiple distinct data blocks, each data block representing at least a portion of a media effect command. For instance, the method may involve the spoofing device 110 recording the packet stream 400 transmitted from the media effect designer 104 to the media effect engine 106.

At block 604, the method may involve identifying in the recorded packet stream a first packet having a final portion of a first data block, where in the recorded packet stream a second packet is (sequentially) next after the first packet. For instance, the method may involve the spoofing device 110 identifying in the recorded packet stream 400 a first packet 406d having a final portion of a first data block 404a, where in the recorded packet stream 400 a second packet 406e is (sequentially) next after the first packet 406d.

At block 606, the method may involve determining a time period between transmission of the identified first packet and transmission of the second packet. For instance, the method may involve the spoofing device 110 determining a time period between transmission of the identified packet 402d and transmission of the second packet 402.

At block 608, the method may involve using the recorded packet stream to generate another packet stream including multiple distinct data blocks. For instance, the method may involve the spoofing device 110 using the recorded packet stream 400 to generate another packet stream 500.

At block 610, the method may involve identifying in the generated packet stream a third packet that includes a final portion of a second data block that corresponds to the first data block, where in the generated packet stream a fourth packet is (sequentially) next after the third packet. For instance, the method may involve the spoofing device 110 identifying in the generated packet stream 500 a third packet 502d that includes a final portion of a second data block 504a that corresponds to the first data block 504b, where in the generated packet stream 500 a fourth packet 502e is (sequentially) next after the third packet 502d.

At block 612, the method may involve transmitting the generated packet stream to the media effect engine, where transmitting the generated packet stream to the media effect engine involves: (i) transmitting the third packet and (ii) following at least the determined time period after transmitting the third packet, transmitting the fourth packet. For instance, the method may involve the spoofing device 110 transmitting the generated packet stream 500 to the media effect engine 106, where the spoofing device 110 transmitting the generated packet stream 500 to the media effect engine 106 involves: (i) the spoofing device transmitting the third packet 502d to the media effect engine 106 and (ii) following at least the determined time period after transmitting the third packet 502d, the spoofing device transmitting the fourth packet 502e to the media effect engine 106.

In some examples, a scheduling system may be configured to cause the spoofing device to perform one or more of the steps described above based on an entry in a rundown. Generally, a rundown is a schedule of events (and related information) that make up a news program. Based on a rundown entry being associated with the assigned identifier, the scheduling system may cause the media effect engine to retrieve and run the media effect. This may involve the scheduling system selecting an entry from the rundown, the scheduling system making a determination that the selected entry corresponds to the assigned identifier, and responsive to the scheduling system making the determination, the scheduling system causing the spoofing device to transmit data generated from the recorded data to the media effect engine.

The scheduling system may also be configured to select and process rundown entries in order. As such, a user may control the timing as to when the media effect engine retrieves and runs a particular media effect by ensuring that the corresponding assigned identifier is associated with a particular rundown entry.

A further description of how a scheduling system may be configured to cause the spoofing device to perform one or more steps relating to a media effect, such as the steps described above, is provided in the cross-referenced disclosure.

IV. Example Variations

While one or more steps have been described as being performed by certain devices or entities (e.g., the spoofing device 110), the steps may be performed by any device or entity, such as those included in the NPS 100 described above. Further, while the disclosed system and method has been described in connection with a news production system, the disclosed system and method may be implemented in other environments as well.

Also, the steps need not be performed in the disclosed order, although in some examples, an order may be preferred. And not all steps need to be performed to achieve the desired advantages of the disclosed system and method, and therefore not all steps are required.

It should also be noted that the variations described in connection with select examples of the disclosed system and method may be applied to all other examples of the disclosed system or method.

Further, while select examples of the disclosed system and method have been described, alterations and permutations of these examples will be apparent to those of ordinary skill in the art. Other changes, substitutions, and alterations are also possible without departing from the disclosed system and method in its broader aspects as set forth in the following claims.

The invention claimed is:
1. A method comprising:
 a first device recording a packet stream transmitted from a second device to a third device, the recorded packet stream comprising multiple distinct data blocks;

identifying in the recorded packet stream a first packet having a final portion of a first data block, wherein in the recorded packet stream a second packet is next after the first packet;

determining a time period between transmission of the identified first packet and transmission of the second packet;

using the recorded packet stream to generate another packet stream comprising multiple distinct data blocks;

identifying in the generated packet stream a third packet that includes a final portion of a second data block that corresponds to the first data block, wherein in the generated packet stream a fourth packet is next after the third packet; and transmitting the generated packet stream to the third device, wherein transmitting the generated packet stream to the third device comprises: (i) transmitting the third packet and (ii) following at least the determined time period after transmitting the third packet, transmitting the fourth packet.

2. The method of claim 1, wherein the second device is configured for designing one or more media effects, and the third device is configured for running one or more media effects.

3. The method of claim 2, wherein the packet stream includes instructions that cause the third device to retrieve and run a media effect on a preview channel of the third device.

4. The method of claim 2, wherein the first data block represents a least a portion of a media-effect command.

5. The method of claim 1, wherein identifying in the recorded packet stream the first packet having the final portion of the first data block comprises determining that the first packet includes a threshold amount of consecutive zero bits.

6. The method of claim 5, wherein the threshold amount is a value in a range from zero to twelve-hundred.

7. The method of claim 1, wherein identifying in the recorded packet stream the first packet having the final portion of the first data block comprises determining that a difference in time between transmission of the first packet and transmission of the second packet exceeds a threshold time period.

8. The method of claim 7, wherein the threshold time period is a value in a range from twenty to thirty milliseconds.

9. The method of claim 1, wherein the recorded packet stream and the generated packet stream have an equal number of data blocks.

10. The method of claim 1, wherein each data block in the recorded packet stream spans multiple packets in the recorded data stream.

11. A method comprising:
a device recording a packet stream transmitted from a media effect designer to a media effect engine, the recorded packet stream comprising multiple distinct data blocks, each data block representing at least a portion of a media effect command;

identifying in the recorded packet stream a first packet having a final portion of a first data block, wherein in the recorded packet stream a second packet is next after the first packet;

determining a time period between transmission of the identified first packet and transmission of the second packet;

using the recorded packet stream to generate another packet stream comprising multiple distinct data blocks;

identifying in the generated packet stream a third packet that includes a final portion of a second data block that corresponds to the first data block, wherein in the generated packet stream a fourth packet is next after the third packet; and transmitting the generated packet stream to the media effect engine, wherein transmitting the generated packet stream to the media effect engine comprises: (i) transmitting the third packet (ii) and following at least the determined time period after transmitting the third packet, transmitting the fourth packet.

12. The method of claim 11, wherein identifying in the recorded packet stream the first packet having the final portion of the first data block comprises determining that the first packet includes a threshold amount of consecutive zero bits.

13. The method of claim 12, wherein the threshold amount is a value in a range from zero to twelve-hundred.

14. The method of claim 11, wherein identifying in the recorded packet stream the first packet having the final portion of the first data block comprises determining that a difference in time between transmission of the first packet and transmission of the second packet exceeds a threshold time period.

15. The method of claim 14, wherein the threshold time period is a value in a range from twenty to thirty milliseconds.

16. The method of claim 11, wherein the recorded packet stream and the generated packet stream have an equal number of data blocks.

17. The method of claim 11, wherein each data block in the recorded packet stream spans multiple packets in the recorded data stream.

18. A system comprising a non-transitory computer-readable medium including instructions that, when executed by a processor, cause performance of a set of steps comprising:
recording a packet stream transmitted from a first device to a second device, the recorded packet stream comprising multiple distinct data blocks;

identifying in the recorded packet stream a first packet having a final portion of a first data block, wherein in the recorded packet stream a second packet is next after the first packet;

determining a time period between transmission of the identified first packet and transmission of the second packet;

using the recorded packet stream to generate another packet stream comprising multiple distinct data blocks;

identifying in the generated packet stream a third packet that includes a final portion of a second data block that corresponds to the first data block, wherein in the generated packet stream a fourth packet is next after the third packet; and transmitting the generated packet stream to the second device, wherein transmitting the generated packet stream to the second device comprises: (i) transmitting the third packet (ii) and following at least the determined time period after transmitting the third packet, transmitting the fourth packet.

19. The system of claim 18, further comprising the processor.

20. The system of claim 19, wherein the first device is configured for designing one or more media effects, and the second device is configured for running one or more media effects.

* * * * *

UNITED STATES PATENT AND TRADEMARK OFFICE
CERTIFICATE OF CORRECTION

PATENT NO.       : 9,094,284 B1
APPLICATION NO.  : 14/047805
DATED            : July 28, 2015
INVENTOR(S)      : Hank J. Hundemer It is certified that error appears in the above-identified patent and that said Letters Patent is hereby corrected as shown below:

In the specification
1. At column 6, line 28, replace "though these communicate paths" with "through these communication paths."
In the claims
2. At column 13, line 29, replace "a least a portion" with "at least a portion."
3. At column 14, lines 58-59, replace "a processor" with "the processor."

Signed and Sealed this
Ninth Day of August, 2016

Michelle K. Lee
*Director of the United States Patent and Trademark Office*